Figure 1:
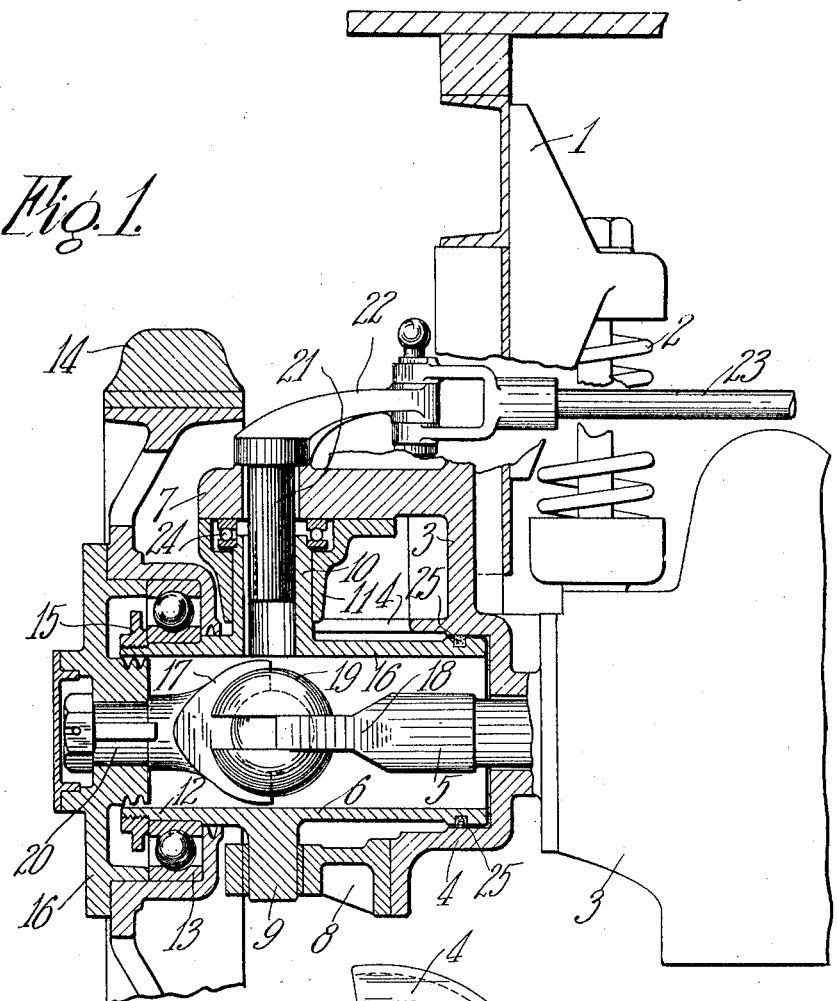

G. R. FAIRCHILDS.
MOTOR DRIVEN VEHICLE CONSTRUCTION.
APPLICATION FILED MAR. 26, 1918.

1,343,358. Patented June 15, 1920.

WITNESSES:
W. C. Ross

INVENTOR.
George R. Fairchilds.
BY Chapin + Neal
ATTORNEYS.

UNITED STATES PATENT OFFICE.

GEORGE R. FAIRCHILDS, OF HOLYOKE, MASSACHUSETTS, ASSIGNOR TO J. LEWIS WYCKOFF, EDWARD N. WHITE, AND GEORGE F. JENKS, ALL OF HOLYOKE, MASSACHUSETTS, TRUSTEES, DOING BUSINESS AS COWAN TRUCK COMPANY.

MOTOR-DRIVEN-VEHICLE CONSTRUCTION.

1,343,358.  Specification of Letters Patent.  Patented June 15, 1920.

Application filed March 26, 1918. Serial No. 224,778.

*To all whom it may concern:*

Be it known that I, GEORGE R. FAIRCHILDS, a citizen of the United States of America, residing at Holyoke, in the county of Hampden and State of Massachusetts, have invented certain new and useful Improvements in Motor-Driven-Vehicle Construction, of which the following is a specification.

In motor driven vehicles, particularly in the commercial class, as tractors, for example, it is desirable to have some or all of the wheels arranged to function as driving and steering wheels. Due to the extremely heavy service to which wheels arranged for this double function are subjected, it is of prime importance to so construct the support and structure for the driving and steering functions that the desired results in operation and long service will be obtained.

This invention in its conception and in its reduction to a preferred form has for its principal feature a balanced construction in which the support for the traction wheel, the driving connection to the traction wheel, and the means to turn the traction wheel for steering are all designed to best obtain their single purposes, and at the same time they are all coördinated one to another to best obtain the combined purpose of the whole.

More particularly, as embodied in my present preferred form disclosed for purposes of illustration, the traction wheel, according to my invention, is supported on and rotates about a housing member functionally equivalent to a standard dead axle construction. The live axle extends through this housing member and drives the wheel at any angle through a standard universal joint. The housing member is pivoted to the frame of the vehicle by trunnions located close to the vertical plane of the wheel or tread, and is constructed to effectively bear upon the frame at a considerable distance from the trunnions and upon the wheel at a much less distance from the trunnions so as to leave the trunnions free and easy for their steering function. The housing member in coöperation with the frame and the hub cap of the wheel surrounds the live axle and more particularly its universal joint and protects it at all times against the accumulation of dirt, while at the same time the housing member so arranged serves as a large closed receptacle for lubricant to keep the universal joint in good operating condition. With the arrangement of structure as stated, it is important to provide for the desired readily operated steering function. For this purpose, I have so located the trunnion supports for the housing member that the latter may be turned freely because it is supported at the inner end on bearings directly on the frame and at the outer end upon the wheel while the trunnions are preferably located much closer to the wheel support of the housing than the frame support therefor. Accordingly the weight of the load carrying vehicle frame may be, and preferably is, imposed through a suitable bearing directly on the housing in line with the vertical axis of the trunnions, so that there is thus only a small load leverage acting to bind the housing in its trunnion bearings, and this small leverage is wholly overcome by the comparatively large leverage due to location of the inner support for the housing on the frame.

The features and objects of the invention will be more particularly pointed out in the claims.

In the accompanying drawings, I have shown one specific embodiment of my invention for purposes of illustration, which will be described in some detail, and then the invention will be claimed in its proper scope.

Referring to the drawings—

Figure 2:
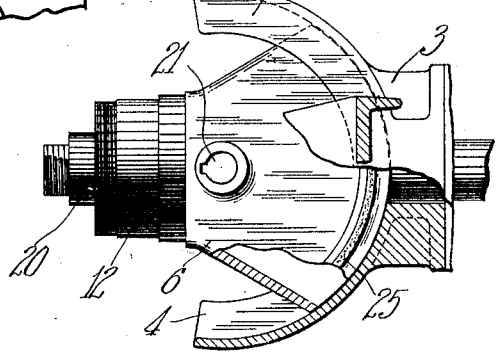

Figure 1 is a sectional view showing the wheel, its assembly on the housing member and sufficient detail of the driving connections, the steering connections, and the vehicle frame parts for an understanding of the invention; and Fig. 2 is a detail plan view partly in section of the housing member and part of the frame.

The invention is shown as applied in mounting a single wheel to a vehicle for the desired operations, and it will be obvious that two or all of the wheels may be mounted on the vehicle in a like manner.

Referring to the drawings, 1 is the load carrying frame supported by spring members 2 (one only of which is shown) upon the main load frame 3. The latter is provided with suitable extensions and brackets adjacent the wheel to support the parts as will be specifically described.

The live axle 5 extends from the differential casing on main frame 3 into the housing member 6. The latter is provided at its outer end with a standard dead axle wheel bearing support 12 on which the wheel 14 is rotatably mounted in the usual way through the anti-friction bearing 13. The bearing 13 is held to the support and the hub of the wheel by the retaining member 15 and the hub cap 16. The live axle 5 drives the wheel 14 through a suitable universal joint comprising, in this instance, a ball 19 grooved at right angles to receive the yoke member or fork 18 directly on live axle 5 and fork 17 on the stud 20 bolted and keyed to hub cap 16, as indicated. It will be readily seen that the axle 5 by this construction may drive wheel 14 at whatever angle the latter may take in the steering operations.

To provide for the steering function, the housing member 6 is mounted on the frame in trunnions 9 and 10, which are provided with suitable bearings in the brackets 8 and 11 firmly fastened to the frame extensions 4 and 7. These trunnions are purposely located so that their common vertical axis will closely approach the central vertical plane of the wheel 14. The trunnion 10 is hollow to receive the pin 21 which is keyed thereto and connected by links 22 and 23 to the steering control in the usual manner. Thus, when links 22 and 23 are operated to turn wheel 14, the housing 6 moves as a whole on the axis of the trunnions 9 and 10, which, as stated, is close to the center plane of the wheel 14. The tread of the latter on the ground is, of course, the ultimate bearing of that part of the load carried by that wheel.

For the purpose of eliminating the strains in the vehicle and particularly in the moving parts thereof where the driving and steering functions are accomplished, I provide a bearing 24 (in this instance, an antifriction bearing) upon which an extension 7 of the frame 3 rests. The load then is transmitted to the wheel in line with the vertical axis of the trunnions 9 and 10 and thus through the housing 6 to the wheel. Due to the lever arm between the vertical plane of the wheel or the bearing 13 and the axis of the trunnions, the load would ordinarily tend to cramp or bind the trunnions in their bearings or tilt the housing member.

To leave the trunnions and their bearings free from strain and for other purposes, the housing 6 is extended inwardly and widened out at the sides, as indicated in Fig. 2, while the frame 3 is extended by the vertical and horizontal ledges 4 to provide a bearing for the housing extension and close off its inner open end at whatever angle the housing may take. The horizontal walls of the housing bear against the horizontal ledges 4 of the frame, and the packing 25 (felt is suitable) is provided, as shown, to effectually close the housing with respect to the frame. The vertical walls of the housing are closed off by the vertical walls of the frame 3 by a close fit, which is not subjected to strains. It will now be seen that the load, acting through the short lever arm from the trunnions to the wheel, can not cramp the trunnions in their bearings for the reason that the long lever arm from the trunnions through the housing to the wide and effectual bearing on the ledge 4 of the frame will absolutely overcome and control the slightest tendency to cramp the trunnions. Thus, the load is properly transmitted to the wheel from the frame and through the housing, whereby the wheel may be best mounted for its function, and the steering mechanism may be best mounted for its function.

As the wheel is turned for steering, the housing with the hub cap and frame at all times surrounds the universal joint and the outer end of the live axle 5. The opening from the frame through which the live axle extends leads into the housing. The capacity of the latter is large enough to accommodate the outer end of the live axle and the universal joint throughout the steering range.

The live axle and universal joint, therefore, are at all times protected from dirt by permanent structure and arrangement. Furthermore, the housing of large capacity may be filled with grease which will be effectively pocketed around the universal joint at all times to assist its operation under the severe service contemplated.

I have now described a preferred form of my invention to support the claims of this specification as required by statute. It is obvious that the conception of the invention may be reduced to many specific embodiments other than the one disclosed, and I intend, therefore, to point out the scope of the invention by means of the claims rather than by the specific illustration of only one embodiment.

What I claim is—

1. In a mounting for connecting a driven steerable wheel to a vehicle frame having bearing parts, in combination, a housing presenting a wheel spindle of a wheel-supporting length to fully support said wheel, a wheel, said wheel being fully supported upon said spindle, a pivot bearing and a part-circular bearing both carried by said housing and connected with the bearing parts of the frame, said parti-circular bearing having its bearing surfaces located to constitute the bearing, a steadying bearing for the pivot bearing; said length of said spindle being within the circle of which said part-circular bearing defines a part, but at the side of said pivot bearing opposite said part-circular bearing; whereby said part-circular bearing presents a portion of a completely circular bearing of long radius to effectually resist tilting of the pivot bearing, and, by its part-circular form, provides for the placing of the wheel spindle, and the wheel, close to the pivot bearing; a universal joint received in said housing, and means connecting said joint to the wheel and to the driving mechanism of the vehicle.

2. In a mounting for connecting a driven steerable wheel to a vehicle frame having bearing parts, in combination, a housing presenting a wheel spindle of a wheel-supporting length to fully support said wheel, a wheel, said wheel being fully supported upon said spindle, a pivot bearing and a part-circular bearing both carried by said housing and connected with the bearing parts of the frame, said part-circular bearing having its bearing surfaces located to constitute the bearing a steadying bearing for the pivot bearing; said length of said spindle being within the circle of which said part-circular bearing defines a part, but at the side of said pivot bearing opposite said part-circular bearing; whereby said part-circular bearing presents a portion of a completely circular bearing of long radius to effectually resist tilting of the pivot bearing, and, by its part-circular form, provides for the placing of the wheel spindle, and the wheel, close to the pivot bearing; a universal joint received in said housing, and means connecting said joint to the wheel and to the driving mechanism of the vehicle; said housing being in the character of a box-like structure presenting said spindle at one end, and presenting at the other end a portion flared to present the said part-circular bearing and to provide for the swing of the housing and having an opening at its end to provide for non-interference of said housing and said means for connecting said joint to the driving mechanism of the vehicle.

3. In a mounting for connecting a driven steerable wheel to a vehicle frame having bearing parts, in combination, a housing presenting a wheel spindle of a wheel-supporting length to fully support said wheel, a wheel, said wheel being fully supported upon said spindle, a pivot bearing and a part-circular bearing both carried by said housing and connected with the bearing parts of the frame, said part-circular bearing having its bearing surfaces located to constitute the bearing a steadying bearing for the pivot bearing; said length of said spindle being within the circle of which said part-circular bearing defines a part, but at the side of said pivot bearing opposite said part-circular bearing; whereby said part-circular bearing presents a portion of a completely circular bearing of long radius to effectually resist tilting of the pivot bearing, and, by its part-circular form, provides for the placing of the wheel spindle, and the wheel, close to the pivot bearing; a universal joint received in said housing, and means connecting said joint to the wheel and to the driving mechanism of the vehicle; said housing being in the character of a box-like structure presenting said spindle at one end, and presenting at the other end a portion flared to present the said part-circular bearing and to provide for the swing of the housing and having an opening at its end to provide for non-interference of said housing and said means for connecting said joint to the driving mechanism of the vehicle; said frame being provided with a wall for closing said opening of said housing and extending the length of the arc of swing of said housing, thereby to close said end throughout the swing and constitute said housing a fully closed lubricant container.

4. In a device of the character indicated, in combination, a vehicle frame provided with pivot bearing parts, connections for driving a driven steerable wheel, and a housing for mounting said wheel and for housing said connections; said housing being in the character of a hollow structure carrying pivot bearing parts for coöperation with said bearing parts of the vehicle frame, and having a box-like portion flaring away from the pivotal axis of the pivot bearing to provide for non-interference of said housing and said connections during the swing of said housing, and said housing also having a spindle-like wheel-carrying portion extending from the narrow end of said flared portion and at the opposite side of said pivotal axis from said flared portion.

5. In a device of the character indicated, in combination a vehicle frame provided with pivot bearing parts, connections for driving a driven steerable wheel, and a housing for mounting said wheel and for housing said connections; said housing being in the character of a hollow structure carrying pivot bearing parts for coöperation with said bearing parts of the vehicle frame, and having a box-like portion flaring away from the pivotal axis of the pivot bearing and having an opening at the outer end of the flared portion, both to provide for non-interference of said housing and said connections during the swing of said housing, said frame being provided with a wall for closing said opening of said housing and extending the length of the arc of swing of said housing, thereby to close said end throughout the swing and constitute said housing a fully closed lubricant container, and said housing also having a spindle-like wheel-carrying portion extending from the narrow end of said flared portion and at the opposite side of said pivotal axis from said flared portion.

6. In a vehicle, the frame thereof including bearing parts, in combination, a driven steerable wheel having a hub, and a housing for connecting the wheel and frame, a pivot bearing and a part-circular bearing both carried by said housing and connected with the bearing part of the frame, said part-circular bearing having its bearing surfaces located to constitute the bearing a steadying bearing for the pivot bearing, said housing having a spindle for said hub at the side of said pivot bearing opposite said part-circular bearing, and said hub being mounted upon said spindle with that end of the hub lying the nearer to the pivot bearing supported by that portion of the spindle lying substantially within the plane of said end, the plane of said wheel and said portion of said spindle lying within the circle of which said part-circular bearing defines a part; whereby said part-circular bearing presents a portion of a completely circular bearing of long radius to effectually resist tilting of the pivot bearing, and by its part-circular form provides for the placing of the wheel spindle, the bearing of said nearer end of said hub, and the plane of said wheel, close to the pivot-bearing; a universal joint received in said housing, and means connecting said joint to the wheel and the driving mechanism of the vehicle.

7. In motor vehicle construction, a load frame, a live axle extending therethrough, a hollow strain resisting housing member to receive the outer end of said axle, and provided with a bearing support for the wheel, a universal joint within the housing to connect said end of the axle to the wheel, spaced horizontal lugs on said frame between which the housing is received, trunnions arranged vertically in line with the universal joint and close to said wheel bearing support to pivotally connect the housing to said lugs, an expanded box-like structure having side walls, parallel with and diverging from the axis of said trunnions toward said frame, and flat parallel top and bottom walls normal to said axis, the last named walls being curved concentrically with respect to said axis, a curved vertical wall on the load frame to close the open end of said expanded box-like structure, and spaced ledges extending outwardly from said vertical wall to engage the flat top and bottom walls and provide an effective bearing for the housing to bear against and prevent twisting or side strains on said trunnions.

GEORGE R. FAIRCHILDS.